(12) United States Patent  
Geltser et al.

(10) Patent No.: US 7,219,703 B2  
(45) Date of Patent: May 22, 2007

(54) ROTATING MULTI-CHAMBER TABLET FEEDER

(75) Inventors: Aleksandr Geltser, Stamford, CT (US); Vladimir Gershman, Stamford, CT (US)

(73) Assignee: Kirby Lester, LLC, Stamford, CT (US)

( * ) Notice: Subject to any disclaimer, the term of this patent is extended or adjusted under 35 U.S.C. 154(b) by 339 days.

(21) Appl. No.: 10/849,092

(22) Filed: May 19, 2004

(65) Prior Publication Data

US 2005/0166995 A1 Aug. 4, 2005

Related U.S. Application Data

(63) Continuation-in-part of application No. 10/770,823, filed on Feb. 3, 2004.

(51) Int. Cl.  
B65B 43/42 (2006.01)  
A61J 7/00 (2006.01)  
B65H 1/00 (2006.01)

(52) U.S. Cl. ............. 141/130; 141/102; 141/105; 221/133; 53/168

(58) Field of Classification Search ............. 141/1, 141/2, 18, 94, 100–107, 129, 130, 192, 198, 141/83; 221/7, 9, 123, 129, 133; 53/52, 53/168, 493, 495, 501  
See application file for complete search history.

(56) References Cited

U.S. PATENT DOCUMENTS 3,722,740 A * 3/1973 List ................... 221/7  
4,024,984 A 5/1977 Gyimothy et al. ......... 221/203  
4,094,439 A 6/1978 List ................... 221/9  
4,470,519 A 9/1984 Cronan ................ 221/188  
4,690,301 A 9/1987 Hogberg ................ 231/2  
4,903,861 A 2/1990 Yuyama ................ 221/265  
5,803,309 A 9/1998 Yuyama et al. .......... 221/82  
5,810,198 A * 9/1998 Townsend et al. ......... 221/7  
6,394,308 B1 5/2002 Yuyama et al. .......... 221/265  
6,471,090 B1 10/2002 Inamura et al. .......... 221/124  
6,497,342 B2 12/2002 Zhang et al. ........... 221/265  
6,516,970 B2 2/2003 Bejerano ............... 221/173  
6,681,550 B1 1/2004 Aylward ............... 53/473  
2002/0096535 A1 7/2002 Zhang et al. ........... 221/258  
2005/0269346 A1 * 12/2005 Limback et al. ......... 221/198

* cited by examiner

Primary Examiner—Timothy L. Maust  
(74) Attorney, Agent, or Firm—Gordon & Jacobson, PC

(57) ABSTRACT

An improved tablet feeder includes a rotating body defining multiple chambers that are arranged in fluid communication with one another in a serial manner. Tablets flow through the multiple chambers for discharge from the tablet feeder. The rotating body has a rotational axis that is oriented at an inclination angle less than 60 degrees from horizontal. The chambers preferably include a primary chamber that holds a large number of tablets, a secondary chamber (which may have a frusto-conical sector or wedge shape) that is disposed at a position offset from the rotational axis, and a third chamber and exit tube disposed along the rotational axis. The device may be adapted to provide for singular and/or non-singular discharge of tablets from the exit tube during rotation of the rotating body.

65 Claims, 6 Drawing Sheets

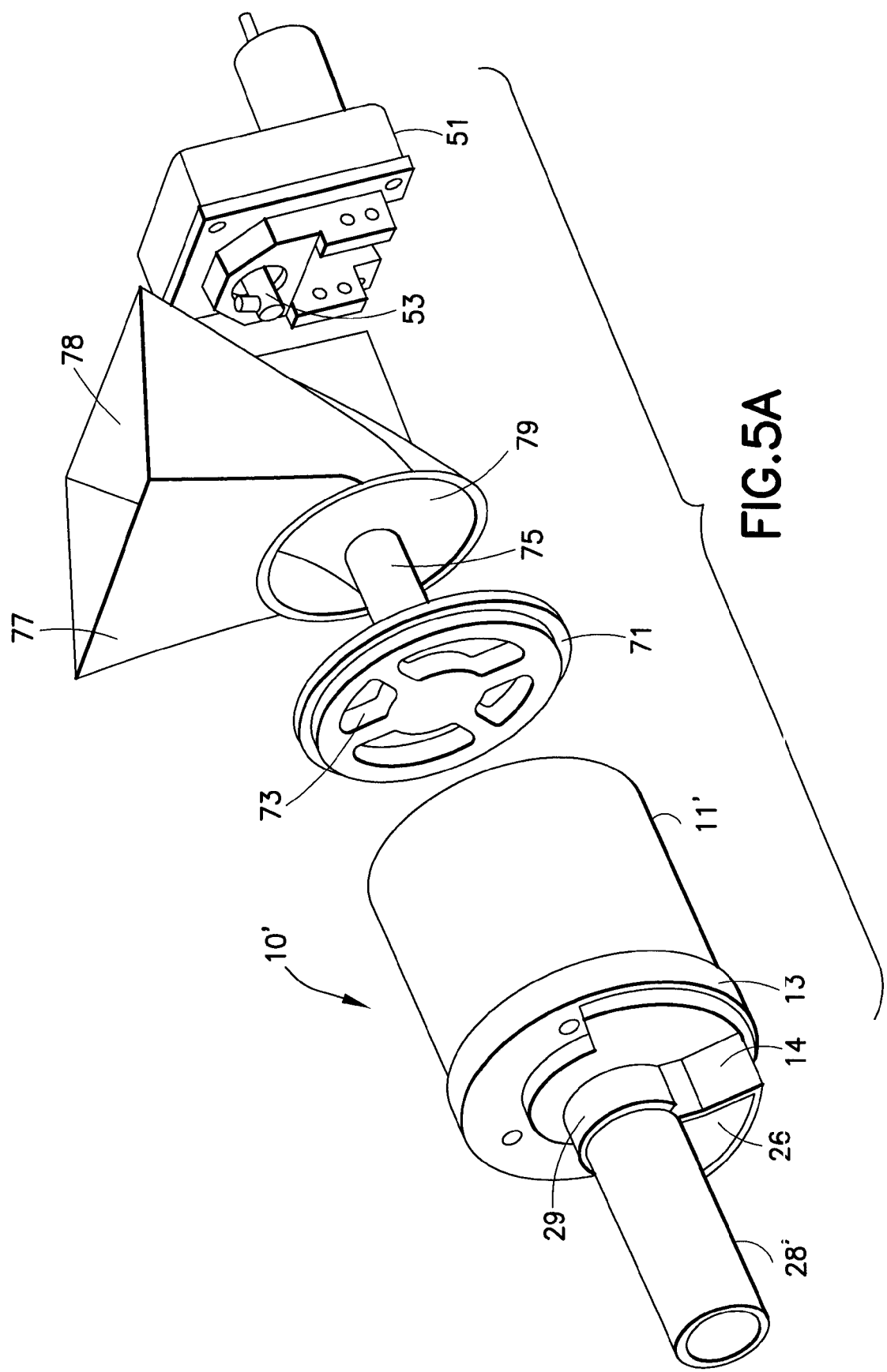

ROTATING MULTI-CHAMBER TABLET FEEDER

This application is a continuation-in-part of U.S. Ser. No. 10/770,823, filed on Feb. 3, 2004, incorporated by reference herein in its entirety.

BACKGROUND OF THE INVENTION

1. Field of the Invention

The present invention relates broadly to medicament tablet dispensing. More particularly, this invention relates to medicament tablet feeding apparatus for use in a medicament tablet dispensing system.

2. State of the Art

In retail, hospital, and mail order medication dispensing, a large number of different prescriptions of single dose medications, such as tablets, must be filled. (Herein, references to "tablets" should be understood as being generic to tablets, capsules, caplets and any other solid dose medication).

Larger quantity prescriptions are often filled with the aid of a tablet feeder and counting apparatus intended to rapidly count different quantities of different tablets successively. Such apparatus employ a tablet feeder device that reduces a collection of discrete tablets to an orderly line of flow typically for subsequent counting and packaging. The tablet feeder device can take various forms including rotational and linear vibrators, rotating discs, air jets, gravity feeds, moving belts, etc.

The vibrating devices generally include an input hopper or bowl and various funnels, chutes, or channels, one or more of which are vibrated by vibrator coils so as to direct the objects into one or more single-file lines of flow.

The rotational devices typically include a hopper body that rotates about a vertical axis. The tablets held in the hopper body are guided to opening(s) near the outer edge of the hopper body for discharge therefrom into one or more single-file lines of flow. An example of such a feeding device is shown in U.S. Pat. No. 4,903,861.

It is difficult to adapt the prior art tablet feeding devices such that they can be used for a wide range of tablets of different size and shape. Thus, there remains a need in the art to provide a tablet feeding device that is readily adaptable for a wide range of tablets of different size and shape. The present invention fulfills these and other needs, and addresses other deficiencies of the prior art implementations and techniques.

SUMMARY OF THE INVENTION

It is therefore an object of the invention to provide a device for feeding medicament tablets that is readily adaptable for a wide range of tablets of different size and shape.

It is another object of the invention to provide a tablet feeding device that is capable of discharging tablets in a singular fashion.

It is a further object of the invention to provide a tablet feeding device that is capable of discharging tablets in a non-singular fashion.

It is also an object of the invention to provide a tablet feeding device which utilizes rotation and gravity to discharge tablets therefrom.

It is an additional object of the invention to provide a tablet feeding device which ensures that all tablets loaded into the device are appropriately dislodged therefrom during operation.

In accord with these objects, which will be discussed in detail below, an improved tablet feeder includes a rotating body defining multiple chambers that are arranged in fluid communication with one another in a serial manner. Tablets flow through the multiple chambers for discharge from the tablet feeder. The rotating body has a rotational axis that is oriented at an inclination angle less than 60 degrees from horizontal.

It will be appreciated that the tablet feeder device may be adapted to provide for singular and/or non-singular discharge of tablets from the exit tube during rotation of the rotating body, and is readily adapted to provide such singular and/or non-singular discharge for a wide variety of tablets of different size and shape.

According to one embodiment of the invention, the chambers of the rotating body include a primary chamber that holds a large number of tablets, a secondary chamber that is disposed at a position offset from the rotational axis, and a third chamber and exit tube disposed along the rotational axis. The secondary chamber preferably has frusto-conical sector or wedge shape. Preferably, the volumes and/or inlet size of the chambers decrease along a flow path through the chambers.

According to another aspect of the invention, the rotating body is detachably coupled (preferably by a magnetic coupling mechanism) to a machine-controlled rotating shaft to provide quick and efficient filling and re-filling of tablets into the body. This feature also provides quick and efficient switching between body components (or the entire body itself) to provide for feeding of tablets of different size and shape.

Additional objects and advantages of the invention will become apparent to those skilled in the art upon reference to the detailed description taken in conjunction with the provided figures.

BRIEF DESCRIPTION OF THE DRAWINGS

FIG. 5A is an exploded perspective view of an alternate embodiment of a tablet feeder device in accordance with the present invention.

DETAILED DESCRIPTION OF THE PREFERRED EMBODIMENTS

Figure 1:
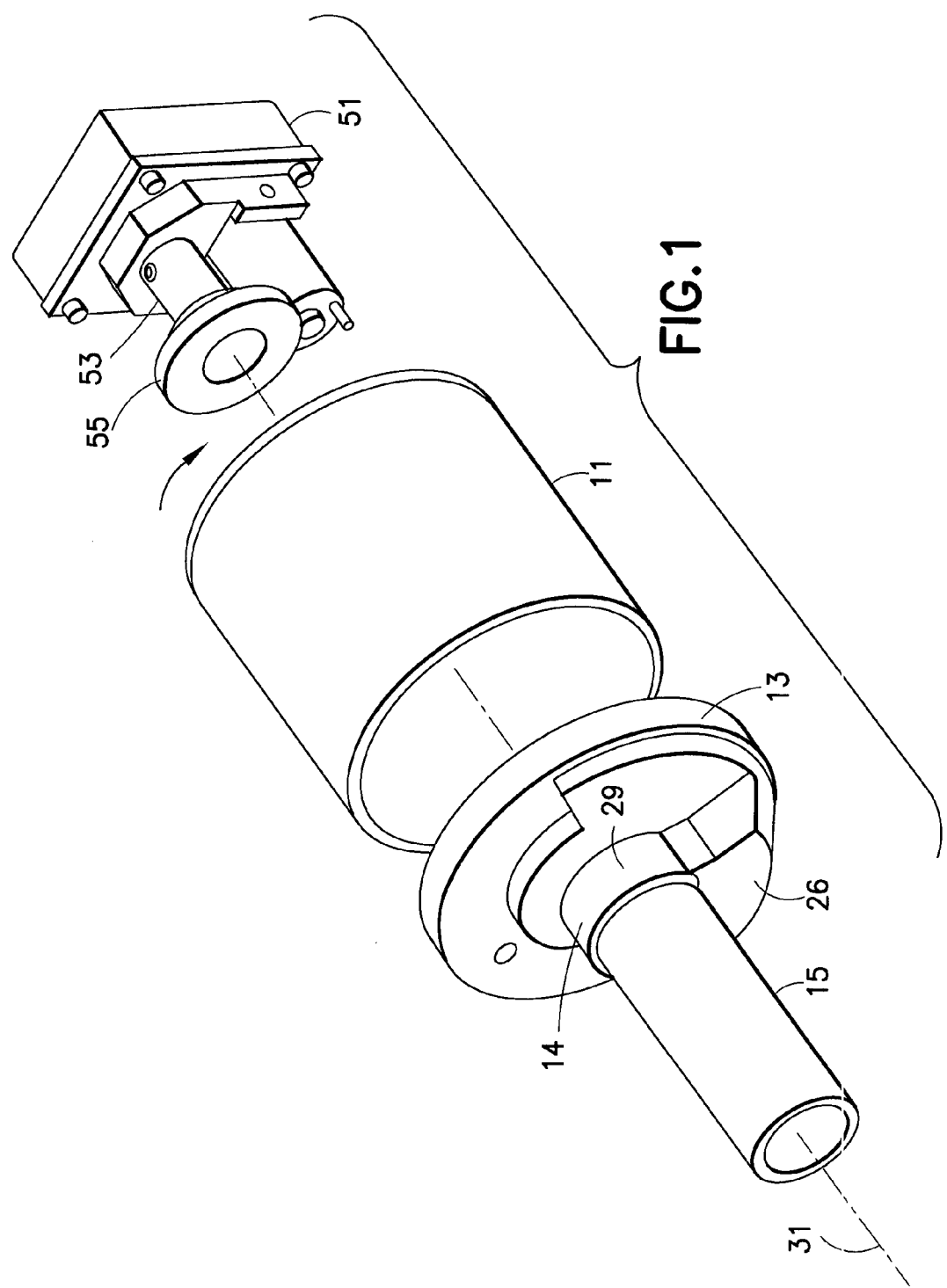
FIG. 1 is an exploded perspective view of a tablet feeder device in accordance with the present invention.
Figure 2:
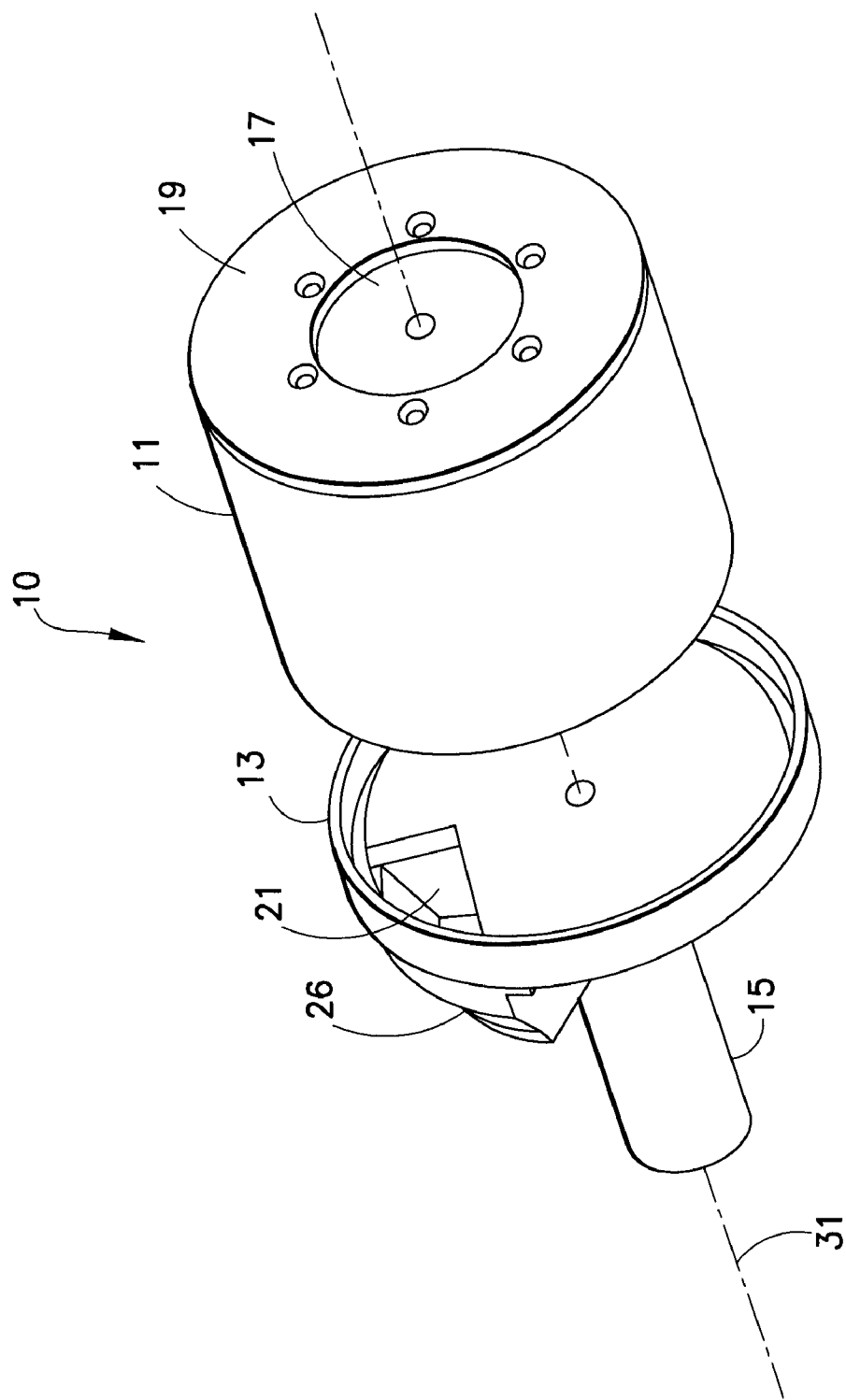
FIG. 2 is an exploded perspective view of the rotatable body of the tablet feeder device of FIG. 1.
Figure 3:
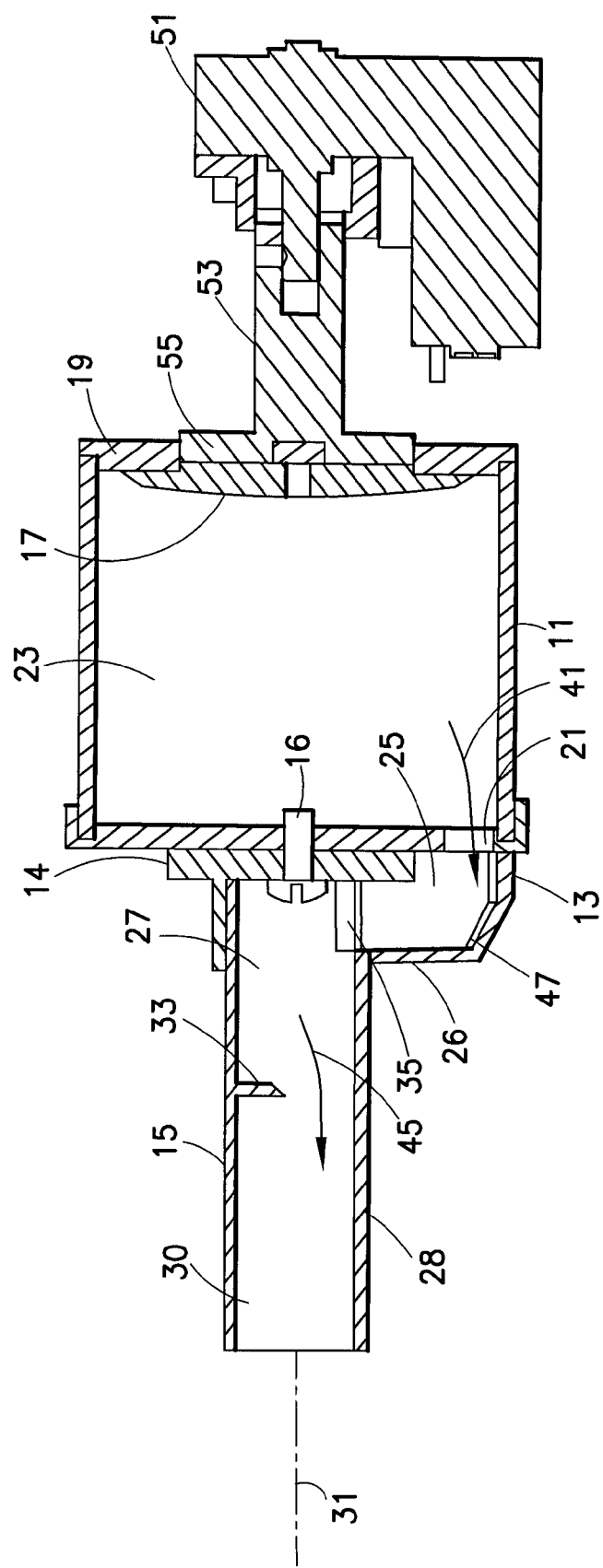
FIG. 3 is a section view of the tablet feeder device of FIG. 1 at a point in the rotation of the body where the secondary chamber of the body is disposed at its bottom point.

Turning now to FIGS. 1–4, a tablet feeder device in accordance with the present invention includes a rotatable body 10 with four parts 11, 13, 14, and 15. The first part 11 is a cylinder, which is preferably formed from a transparent plastic material. The cylinder 11 preferably includes an insert 17 (FIGS. 2–4) realized by magnetic material (such as iron or stainless steel) that is integrated into an end wall 19 of the cylinder. The second part 13 is a removable cover that fits snuggly over the open end of the cylinder 11. The inside surface of the cover 13 has a wedge-shaped opening 21 disposed near its edge as shown in FIG. 3. The cylinder 11 and the removable cover 13 provide a primary chamber 23 for holding tablets therein. The third part 14 is attached to the second part 13, preferably with a screw 16 as shown. The third part 14 includes a wall 26 that defines a secondary chamber 25 for holding tablets therein. The secondary chamber 25 is disposed adjacent the opening 21 in the cover 13 such that it is in fluid communication with the primary chamber 23. The secondary chamber 25 preferably has a frusto-conical sector or wedge shape that is displaced radially with respect to the rotational axis 31 of the feeder body 10 as shown. The third part 14 also includes an annular projection 29. A tubular structure 28 that forms the fourth part 15 of the feeder body fits snuggly into the annular projection 29 such that it is supported by the projection 29. The tubular structure 28 defines a tertiary chamber 27 and an exit tube 30 disposed along the rotational axis 31. A cutout 35 in the tubular structure 28 provides a passageway between the secondary chamber 25 and the tertiary chamber 27. The tertiary chamber 27 leads to the exit tube 30. Preferably, the tertiary chamber 27 and exit tube 30 are separated by a wall 33 that projects from the inside diameter surface of the tubular structure 28 toward the rotational axis 31 of the tubular structure 28 as shown.

During operation, a supply of tablets is added to the primary chamber 23, preferably by removing the cover 13 and the parts 14, 15 attached thereto and filling the primary chamber 23 with tablets. After re-attaching the cover 13, the feeder body 10 is tilted downward with respect to the horizontal plane and rotated about the rotational axis 31. As the feeder body 10 rotates about the rotational axis 31, the primary chamber 23 rotates and the tablets disposed therein are mixed. During such mixing, tablets are fed from the primary chamber 23 through the inlet 21 into the secondary chamber 25 (as depicted by the arrow 41 in FIG. 3), further through the cutout 35 into the tertiary chamber 27 (as depicted by the arrow 43 shown in FIG. 4), and further over the wall 33 into the exit tube 30 (as depicted by the arrow 45 shown in FIG. 3). Tablets that flow into the exit tube 30 are discharged therefrom preferably in a singular fashion (i.e., a single-file line of flow). Tablets flow from the primary chamber 23 into the secondary chamber 25, and from the tertiary chamber 27 into the exit tube 30, during a bottom portion (i.e., a portion that encompasses the bottom point of rotation) of the 360-degree rotational range of feeder body 10; while tablets flow from the secondary chamber 25 into the tertiary chamber 27 during a top portion (i.e., a portion that encompasses the top point of rotation) of the 360-degree rotational range of feeder body 10.

The size (i.e., area) of the wedge-shaped opening 21 into the secondary chamber 25 may be user adjustable, e.g., by providing a user-rotatable surface that blocks a variable amount of the opening 21 as its position is manipulated. The size of the opening 21 controls the flow rate of tablets flowing into the secondary chamber and thus controls the tablet feed rate of the tablet feeder device.

Preferably, the volume of the primary chamber 23 is greater than the volume of the secondary chamber 25, and the volume of the secondary chamber 25 is greater than the volume of the tertiary chamber 27. Moreover, the size of the opening 11 into the secondary chamber 25 is preferably greater than the size of the outlet from the tertiary chamber 27 into the exit tube 30 (e.g., the area between the top of the wall 33 and the inside diameter surface of the tubular structure). These features provide discharge of tablets from the exit tube 30 in a singular fashion during rotation of the feeder body 10 as described herein.

In the preferred embodiment, tablets held in the tertiary chamber 27 are capable of flowing back into the secondary chamber 25 when the secondary chamber 25 is disposed at or near its bottom point of rotation. In addition, the walls that form the secondary chamber 25 preferably include a wall 47 with an inclination angle that directs tablets held in the secondary chamber 25 toward the opening 21 when the secondary chamber 25 is disposed at or near its bottom point of rotation. These features provide backpressure for the tablets flowing into the secondary chamber 25 from the primary chamber 23 when the secondary chamber 25 is disposed at or near its bottom point of rotation. Such backpressure assists in regulating the flow rate of tablets through the three chambers of the body during operation. It also assists in providing discharge of tablets from the exit tube 30 in a singular fashion during rotation of the feeder body 10 as described herein.

Figure 4:
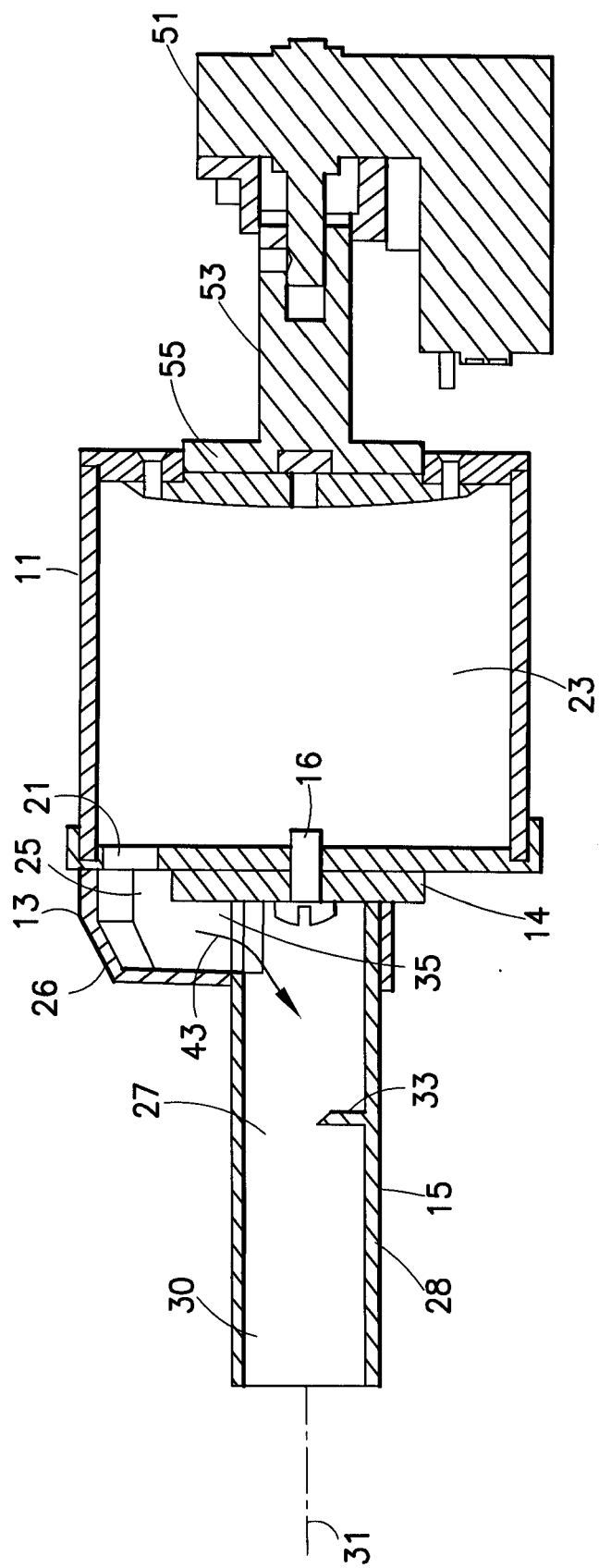
FIG. 4 is a section view of the tablet feeder device of FIG. 1 at a point in the rotation of the body where the secondary chamber of the body is disposed at its top point.

The rotational axis 31 of the feeder body 10 is oriented such that is tilted downward with respect to the horizontal plane as best shown in FIGS. 3 and 4. Preferably, the angle of the tilt between the rotational axis 31 and the horizontal plane is less than 60 degrees, and more preferably between 5 and 20 degrees; however, the tilt angle may extend greater than 60 degrees. This tilt angle may be varied to control the feed rate of the tablets flowing through the chambers and out the exit tube 30. Larger tilt angles provide for greater feed rates. Note that the tilt angle and/or the rotational speed of the body 10 may be adjusted during a given tablet dispensing operation to vary the throughput of the tablets discharged from the feeder body 10. Such adjustments may be accomplished automatically by a controller (not shown).

Moreover, the size (e.g., volumes and inlet area) and shape of the chambers provided by the three parts 11, 13, 15 of the body 10 may be varied for tablets of different size and shape. Such different size parts may be provided to the user for interchangeability as desired.

In the preferred embodiment, an electric motor 51 is provided that rotates an output shaft 53. A permanent magnet 55 is affixed to the end of the output shaft 53. The magnetic insert 17 integral to the end wall 19 of the cylinder 11 is removably mated to the magnet 55. During operation, the electric motor 51 rotates the output shaft 53 and the magnet 55, which in turn rotates the feeder body 10 due to the magnetic insert 17 in the end wall 19 of the cylinder 11 of the feeder. The magnetic coupling between the magnet 55 and the insert 17 enables the user to quickly and efficiently decouple the body 10 to fill/refill the primary chamber 23 with tablets, if need be, or change the components of the body (or the entire body) for tablets of different size or shape.

Figures 5B, 5C:
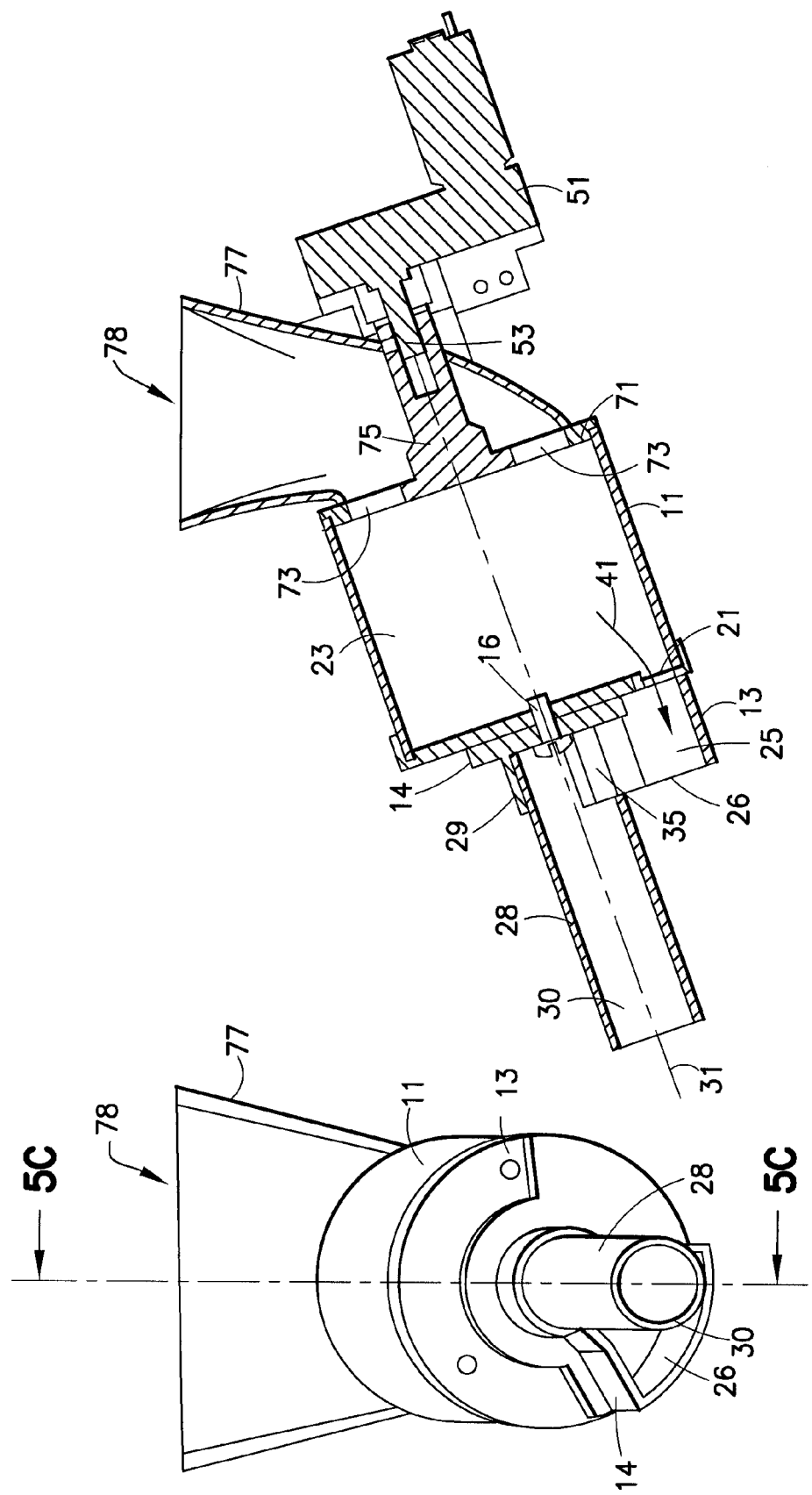
FIG. 5B is a front perspective view of the tablet feeder device of FIG. 5A, illustrating the section view of FIG. 5C.
FIG. 5C is a section view of the tablet feeder device of FIG. 5A at a point in the rotation of the body where the secondary chamber of the body is disposed at its bottom point.

Turning now to FIGS. 5A–5C, there is shown an alternate embodiment of a tablet feeder in accordance with the present invention including a rotatable body 10' with a cylindrical section 11', which is preferably formed from a transparent plastic material. A removable cover 13 fits snuggly over one end of the cylindrical section 11'. An annular drive member 71 attaches snuggly to the other end of the cylindrical section 11'. The drive member 71 has a plurality of apertures 73 formed therein and a shaft 75 projecting outward from the body 10' along its rotational axis 31. A funnel 77 is provided with an inlet 78, an outlet port 79 that leads to the apertures 73 and a tubular opening (not shown) into which is disposed the shaft 75. The shaft 75 mates to the drive shaft 53 of an electric motor 51. The tubular opening of the funnel 77 has a larger diameter than the outer diameter of the shaft 75 such that the shaft 75 and the body 10' rigidly affixed thereto by the drive member 71 are able to rotate about the rotational axis 31 while the funnel 77 remains stationary.

The inside surface of the cover 13 has a wedge-shaped opening 21 disposed near its edge as shown in FIG. 5C. The cylindrical section 11' provides a primary chamber 23 for holding tablets therein. A part 14 is attached to the cover 13, preferably with a screw 16 as shown in FIG. 5C. The part 14 includes a wall 26 that defines a secondary chamber 25 for holding tablets therein. The secondary chamber 25 is disposed adjacent the opening 21 in the cover 13 such that it is in fluid communication with the primary chamber 23. The secondary chamber 25 preferably has a frusto-conical sector or wedge shape that is displaced radially with respect to the rotational axis 31 of the feeder body 10 as shown. The part 14 also includes an annular projection 29. A tubular structure 28 fits snuggly into the annular projection 29 such that it is supported by the projection 29. The tubular structure 28 defines an exit tube 30 disposed along the rotational axis 31. A cutout 35 in the tubular structure 28 provides a passageway between the secondary chamber 25 and the exit tube 30.

During operation, the device is tilted downward with respect to the horizontal plane. The motor 51 may (or may not be) powered on such that body 10' is rotated about the rotational axis 31. A supply of tablets is dropped into the inlet 78 of the funnel 77. With the aid of gravity, the tablets dropped into the inlet 78 flow though the outlet port 79 of the funnel 77 and through the aperture(s) 73 of the drive member 71 into the primary chamber 23 of the rotating body 10'. If need be, the motor 51 is powered on such that body 10' is rotated about the rotational axis 31. As the feeder body 10' rotates about the rotational axis 31, the primary chamber 23 rotates and the tablets disposed therein are mixed. During such mixing, tablets are fed from the primary chamber 23 through the inlet 21 into the secondary chamber 25 (as depicted by the arrow 41 in FIG. 5C), further through the cutout 35 into the exit tube 30 (similar to the tablet flow depicted by the arrow 43 in FIG. 4). Tablets that flow into the exit tube 30 are discharged therefrom preferably in a singular fashion (i.e., a single-file line of flow). Tablets flow from the primary chamber 23 into the secondary chamber 25, during a bottom portion (i.e., a portion that encompasses the bottom point of rotation) of the 360-degree rotational range of feeder body 10'; while tablets flow from the secondary chamber 25 into the exit tube-30 during a top portion (i.e., a portion that encompasses the top point of rotation) of the 360-degree rotational range of feeder body 10. Additional tablets may be supplied to the funnel 77 as needed.

In the preferred embodiment, tablets are discharged from the exit tube in a singular fashion (i.e., a single-file line of flow) during rotation of the feeder body. However, the device as described above can be readily adapted to provide for non-singular discharge where more than one tablet is discharged from the exit tube during rotation of the feeder body. For example, one or more of the following structural parameters can be adapted to provide for non-singular discharge:

i) tilt angle of the feeder body 10 relative to the horizontal plane;

ii) size of the opening 21;

iii) volume of the secondary chamber 25;

iv) size of the cutout 35;

v) volume of the tertiary chamber 27;

vi) size of the wall 33; and viii) diameter of the tubular structure 28.

Note that the inner surface of the cylinder 11 that defines the primary chamber 23 may include a radial wiper arm structure (not shown) that assists in directing tablets to the opening 21 when there are a low number of tablets remaining in the primary chamber 23. This feature helps to empty the primary chamber 23 during operation.

There have been described and illustrated herein embodiments of a medicament tablet feeder. While particular embodiments of the invention have been described, it is not intended that the invention be limited thereto, as it is intended that the invention be as broad in scope as the art will allow and that the specification be read likewise. Thus, while particular configurations have been disclosed in reference to the three chambers of the rotating body, it will be appreciated that other configurations can be used, including configurations with more than three (or less than three) chambers. Furthermore, the sizes and shapes of the chambers of the rotating body (as well as the sizes and shapes of the passageways between such chambers) can be varied. For example, the primary chamber and exit tube of the rotating body may have a frusto-conical shape. In addition, while it is preferable to utilize magnetic coupling to drive the rotating body, it will be appreciated that other detachable coupling mechanisms such as suitable mechanical coupling mechanisms can be used to perform this desired function. Moreover, while the invention has been particularly described with respect to feeding medicament tablets, it will be appreciated the apparatus may be used in a feeding system that feeds discrete objects. It will therefore be appreciated by those skilled in the art that yet other modifications could be made to the provided invention without deviating from its spirit and scope as so claimed.

What is claimed is:

1. A tablet feeder comprising:
   a rotating body defining multiple chambers that are arranged in fluid communication with one another in a serial manner, wherein tablets flow through said multiple chambers for discharge from the tablet feeder, wherein said rotating body has a rotational axis that is oriented at an inclination angle less than 60 degrees from horizontal and has a 360 degree rotational range, wherein said multiple chambers include a first chamber that is disposed at a position offset from said rotational axis, wherein tablets flow into said first chamber during a bottom portion of said rotational range, and wherein tablets flow out of said first chamber during a top portion of said rotational range.

2. A tablet feeder according to claim 1, wherein:
   said first chamber has a frusto-conical sector shape.

3. A tablet feeder according to claim 1, wherein:
   said multiple chambers include a primary chamber that holds a large number of tablets, wherein tablets held in said primary chamber flow through an opening into said first chamber.

4. A tablet feeder according to claim 3, wherein:
   said primary chamber is defined by a cylindrical body and a cover, said cover defining said opening into said first chamber.

5. A tablet feeder according to claim 3, wherein:
   size of said opening is adjustable.

6. A tablet feeder according to claim 3, wherein:
   said multiple chambers include a second chamber disposed along said rotational axis, wherein tablets flow from said first chamber through an opening into said second chamber.

7. A tablet feeder according to claim 6, further comprising:

an exit tube, wherein tablets flow from said second chamber into said exit tube.

8. A tablet feeder according to claim 7, wherein:
said second chamber and said exit tube are formed from a common tubular structure disposed along said rotational axis.

9. A tablet feeder according to claim 8, wherein:
said second chamber and said exit tube are separated by a wall that projects from an inside diameter surface of said tubular structure toward said rotational axis.

10. A tablet feeder according to claim 1, wherein:
volumes of said multiple chambers decrease along a flow path through said multiple chambers.

11. A tablet feeder according to claim 1, wherein:
said inclination angle is less than 20 degrees from horizontal.

12. A tablet feeder according to claim 11, wherein:
said inclination angle is in a range between 5 and 20 degrees from horizontal.

13. A tablet feeder according claim 1, wherein:
tablets are discharged from said tablet feeder in a singular fashion.

14. A tablet feeder according to claim 1, wherein:
tablets are discharged from said tablet feeder in a non-singular fashion.

15. A tablet feeder according to claim 1, further comprising:
a motor for rotating said rotating body.

16. A tablet feeder according to claim 15, further comprising:
a controller for adjusting at least one of rotational speed of said motor and said inclination angle to automatically adjust a throughput rate of tablets flowing through said multiple chambers.

17. A tablet feeder according to claim 15, further comprising:
magnetic coupling elements that magnetically couple a shaft of said motor to said rotating body.

18. A tablet feeder according to claim 1, wherein:
at least one chamber includes an inclined surface that provides backpressure with respect to tablets flowing through said chambers during rotation of said rotating body.

19. A tablet feeder according to claim 1, further comprising:
a stationary gravity-feed funnel for supplying tablets to one of said chambers of said rotating body.

20. A tablet feeder according to claim 19, wherein:
said funnel has a tubular opening into which is disposed a rotating shaft that rotates said rotating body.

21. A tablet feeder comprising:
a rotating body defining multiple chambers that are arranged in fluid communication with one another in a serial manner, wherein tablets flow through said multiple chambers for discharge from the tablet feeder;
wherein said rotating body has a rotational axis that is oriented at an inclination angle from horizontal; and
wherein said chambers are adapted such that tablets can flow backward from at least one chamber to a corresponding preceding chamber during rotation of said rotating body in order to provide backpressure with respect to tablets flowing through said chambers.

22. A tablet feeder according to claim 21, wherein:
said inclination angle is adjustable to vary throughput through said chambers.

23. A tablet feeder according to claim 21, wherein:
said multiple chambers include a first chamber that is disposed at a position offset from said rotational axis.

24. A tablet feeder according to claim 23, wherein:
said rotating body has a 360 degree rotational range, and tablets flow into said first chamber during a bottom portion of said rotational range.

25. A tablet feeder according to claim 24, wherein:
tablets flow out of said first chamber during a top portion of said rotational range.

26. A tablet feeder according to claim 23, wherein:
said first chamber has a frusto-conical sector shape.

27. A tablet feeder according to claim 21, wherein:
said multiple chambers include a primary chamber that holds a large number of tablets, wherein tablets held in said primary chamber flow through an opening into a secondary chamber that is disposed at a position offset from said rotational axis.

28. A tablet feeder according to claim 27, wherein:
said primary chamber is defined by a cylindrical body and a cover, said cover defining said opening into said secondary chamber.

29. A tablet feeder according to claim 28, wherein:
size of said opening is adjustable.

30. A tablet feeder according to claim 28, wherein:
said multiple chambers include a tertiary chamber disposed along said rotational axis, wherein tablets flow from said secondary chamber through an opening into said tertiary chamber.

31. A tablet feeder according to claim 30, further comprising:
an exit tube, wherein tablets flow from said tertiary chamber into said exit tube.

32. A tablet feeder according to claim 31, wherein:
said tertiary chamber and said exit tube are formed from a common tubular structure disposed along said rotational axis.

33. A tablet feeder according to claim 32, wherein:
said tertiary chamber and said exit tube are separated by a wall that projects from an inside diameter surface of said tubular structure toward said rotational axis.

34. A tablet feeder according to claim 21, wherein:
volumes of said multiple chambers decrease along a flow path through said multiple chambers.

35. A tablet feeder according to claim 21, wherein:
said inclination angle is less than 20 degrees from horizontal.

36. A tablet feeder according to claim 35, wherein:
said inclination angle is in a range between 5 and 20 degrees from horizontal.

37. A tablet feeder according claim 21, wherein:
tablets are discharged from said tablet feeder in a singular fashion.

38. A tablet feeder according to claim 21, wherein:
tablets are discharged from said tablet feeder in a non-singular fashion.

39. A tablet feeder according to claim 21, further comprising:
a motor for rotating said rotating body.

40. A tablet feeder according to claim 39, further comprising:
a controller for adjusting at least one of rotational speed of said motor and said inclination angle to automatically adjust a throughput rate of tablets flowing through said multiple chambers.

41. A tablet feeder according to claim 39, further comprising:

magnetic coupling elements that magnetically couple a shaft of said motor to said rotating body.

42. A tablet feeder according to claim 21, wherein:
at least one chamber includes an inclined surface that provides backpressure with respect to tablets flowing through said chambers during rotation of said rotating body.

43. A tablet feeder according to claim 21, further comprising:
a stationary gravity-feed funnel for supplying tablets to one of said chambers of said rotating body.

44. A tablet feeder according to claim 43, wherein:
said funnel has a tubular opening into which is disposed a rotating shaft that rotates said rotating body.

45. A tablet feeder comprising:
a rotating body defining at least three chambers that are arranged in fluid communication with one another in a serial manner, wherein tablets flow through said chambers for discharge from the tablet feeder;
wherein said rotating body has a rotational axis that is oriented at an inclination angle from horizontal and has a 360 degree rotational range;
wherein volumes of said chambers decrease along a flow path through said chambers; and
wherein said chambers include a first chamber that is disposed at a position offset from said rotational axis, wherein tablets flow into said first chamber during a bottom portion of said rotational range, and wherein tablets flow out of said first chamber during a top portion of said rotational range.

46. A tablet feeder according to claim 45, wherein:
said inclination angle is adjustable to vary throughput through said chambers.

47. A tablet feeder according to claim 45, wherein:
said first chamber has a frusto-conical sector shape.

48. A tablet feeder according to claim 45, wherein:
said chambers include a primary chamber that holds a large number of tablets, wherein tablets held in said primary chamber flow through an opening into said first chamber.

49. A tablet feeder according to claim 48, wherein:
said primary chamber is defined by a cylindrical body and a cover, said cover defining said opening into said first chamber.

50. A tablet feeder according to claim 49, wherein:
size of said opening is adjustable.

51. A tablet feeder according to claim 48, wherein:
said chambers include a second chamber disposed along said rotational axis, wherein tablets flow from said first chamber through an opening into said second chamber.

52. A tablet feeder according to claim 51, further comprising:
an exit tube, wherein tablets flow from said second chamber into said exit tube.

53. A tablet feeder according to claim 52, wherein:
said second chamber and said exit tube are formed from a common tubular structure disposed along said rotational axis.

54. A tablet feeder according to claim 52, wherein:
said second chamber and said exit tube are separated by a wall that projects from an inside diameter surface of said tubular structure toward said rotational axis.

55. A tablet feeder according to claim 45, wherein:
said inclination angle is less than 20 degrees from horizontal.

56. A tablet feeder according to claim 45, wherein:
said inclination angle is in a range between 5 and 20 degrees from horizontal.

57. A tablet feeder according to claim 45, wherein:
tablets are discharged from said tablet feeder in a singular fashion.

58. A tablet feeder according to claim 45, wherein:
tablets are discharged from said tablet feeder in a non-singular fashion.

59. A tablet feeder according to claim 45, further comprising:
a motor for rotating said rotating body.

60. A tablet feeder according to claim 59, further comprising:
a controller for adjusting at least one of rotational speed of said motor and said inclination angle to automatically adjust a throughput rate of tablets flowing through said multiple chambers.

61. A tablet feeder according to claim 60, further comprising:
magnetic coupling elements that magnetically couple a shaft of said motor to said rotating body.

62. A tablet feeder according to claim 45, wherein:
at least one chamber includes an inclined surface that provides backpressure with respect to tablets flowing through said chambers during rotation of said rotating body.

63. A tablet feeder according to claim 45, wherein:
said chambers are adapted such that tablets can flow backward from at least one chamber to a corresponding preceding chamber during rotation of said rotating body in order to provide backpressure with respect to tablets flowing through said chambers.

64. A tablet feeder according to claim 45, further comprising:
a stationary gravity-feed funnel for supplying tablets to one of said chambers of said rotating body.

65. A tablet feeder according to claim 64, wherein:
said funnel has a tubular opening into which is disposed a rotating shaft that rotates said rotating body.

* * * * *